United States Patent
Yu et al.

(10) Patent No.: US 11,249,590 B2
(45) Date of Patent: Feb. 15, 2022

(54) INTRA-PANEL INTERFACE FOR CONCURRENT DISPLAY DRIVING AND TOUCH SENSING IN TOUCHSCREEN DISPLAYS

(71) Applicant: Parade Technologies, Ltd., San Jose, CA (US)

(72) Inventors: Quan Yu, Shanghai (CN); Zhengyu Yuan, San Jose, CA (US); Ross Fosler, Lynnwood, WA (US); Denis Ellis, Cork (IR); Zhiqiang Huang, Shanghai (CN); Roel Coppoolse, San Jose, CA (US)

(73) Assignee: PARADE TECHNOLOGIES, LTD., Santa Clara, CA (US)

( * ) Notice: Subject to any disclaimer, the term of this patent is extended or adjusted under 35 U.S.C. 154(b) by 99 days.

(21) Appl. No.: 16/908,534

(22) Filed: Jun. 22, 2020

(65) Prior Publication Data
US 2021/0397324 A1    Dec. 23, 2021

(51) Int. Cl.
*G06F 3/041* (2006.01)
*G06F 3/044* (2006.01)

(52) U.S. Cl.
CPC .......... *G06F 3/04166* (2019.05); *G06F 3/044* (2013.01); *G06F 3/04164* (2019.05)

(58) Field of Classification Search
CPC ..... G09G 2330/021; G09G 2310/0283; G09G 2310/0286; G09G 2310/0278; G09G 2310/0232; G09G 2310/04; G09G 2310/0213; G09G 3/3677; G09G 3/2096; G09G 3/3688; G09G 3/3674; G09G 3/3611; G09G 3/3696; G09G 3/3622; G09G 3/3644; G09G 2300/0426; G06F 2203/04101; G06F 2203/04112; G06F 2203/04103; G06F 2203/04104; G06F 1/3265; G06F 1/3287; G06F 1/3262; G06F 1/3203; G06F 1/3215; G06F 3/0412; G06F 3/04166; G06F 3/0443; G06F 3/044;
(Continued)

(56) References Cited

U.S. PATENT DOCUMENTS

| | | | |
|---|---|---|---|
| 6,459,417 B1* | 10/2002 | Orisaka | G09G 3/3688 345/98 |
| 9,857,911 B1* | 1/2018 | Qu | G06F 3/04166 |

(Continued)

*Primary Examiner* — Dong Hui Liang
(74) *Attorney, Agent, or Firm* — Morgan, Lewis & Bockius LLP

(57) ABSTRACT

This application is directed to intra-panel communication in a touch display device in which a touch-integrated timing controller (TTCON) is coupled to touch-embedded source drivers (TSDs) via a plurality of forward links and a set of backward links. The forward links include a first subset of display forward links and a second subset of touch forward links. The TSDs are electrically coupled to a display panel including a plurality of display pixels and a plurality of touch sensors. The TTCON sends a display drive signal including display content data and display control data over the display forward links, and sends a touch control signal including an instruction to initiate an operation mode over the touch forward links. Upon receiving the touch control signal, the TSDs identify the instruction to initiate the operation mode, generate touch data accordingly, and return the touch data to the TTCON via the backward links.

20 Claims, 7 Drawing Sheets

(58) Field of Classification Search
CPC .... G06F 3/04184; G06F 3/0416; G06F 3/041; G06F 3/04164; G06F 3/0446; G06F 3/041661; G06F 3/04162; G06F 3/0488; G06F 3/04883; G06F 3/04186
See application file for complete search history.

(56) References Cited

U.S. PATENT DOCUMENTS

| | | | |
|---|---|---|---|
| 10,629,157 B2* | 4/2020 | Kim | G09G 3/3275 |
| 10,866,672 B2* | 12/2020 | Seo | G09G 3/20 |
| 2009/0289908 A1* | 11/2009 | Chen | G06F 1/3262 |
| | | | 345/173 |
| 2012/0242628 A1* | 9/2012 | Yuan | G09G 3/3611 |
| | | | 345/204 |
| 2016/0125840 A1* | 5/2016 | Oh | G09G 5/008 |
| | | | 345/213 |
| 2017/0178562 A1* | 6/2017 | Hekmat | G09G 3/2096 |

* cited by examiner

INTRA-PANEL INTERFACE FOR CONCURRENT DISPLAY DRIVING AND TOUCH SENSING IN TOUCHSCREEN DISPLAYS

TECHNICAL FIELD

This application relates to an intra-panel interface of a display device, and in particular a bi-directional intra-panel interface for communicating data between a timing controller and one or more source drivers in a display device having a touch-sensitive surface.

BACKGROUND

A typical pixel based display includes numerous source drivers (also referred to as column drivers). Each of the source drivers drives display content data onto a specified column of a pixel array. A timing controller uses a timing controller-source driver interface to supply display and control data to the source drivers. A conventional timing controller-source driver interface, however, is not optimized to capture and process data from widely adopted multi-function pixel display panels.

SUMMARY

This application is directed to a bi-directional and scalable intra-panel interface that is applied in a display device to couple a touch-integrated timing controller (TTCON) and one or more touch-embedded source drivers (TSDs). The intra-panel interface includes at least a display forward link, a touch forward link, and a backward link. The display forward link and touch forward link are physically separate from each other and are configured to transfer a display drive signal and a touch control signal, respectively. In some embodiments, the display drive signal is scaled according to a resolution of display pixels in the display panel, while the touch control signal is scaled based on a size of a display panel of the display device independently of the display signal and without interfering with the display drive signal.

In one aspect of this application, a method for intra-panel communication is implemented in an electronic device. A plurality of forward links and a set of backward links are established between a TTCON and one or more TSDs. The plurality of forward links including a first subset of display forward links and a second subset of touch forward links. The one or more TSDs are electrically coupled to a display panel including a plurality of display pixels and a plurality of touch sensors. The TTCON sends a display drive signal over the first subset of display forward links, and the display drive signal includes display content data and display control data. The TTCON also sends a touch control signal over the second subset of touch forward links, and the touch control signal includes an instruction to initiate an operation mode on the one or more TSDs or the plurality of touch sensors. In response to receiving the touch control signal, the TSDs identify the instruction to initiate the operation mode in the touch control signal, generate touch data according to the operation mode, and return the touch data to the TTCON via the set of backward links. Particularly, in some embodiments, the first subset of display forward links is physically separate from the second subset of touch forward links. In another aspect, a non-transitory computer-readable medium has one or more programs stored thereon. The one or more programs include instructions which when executed by one or more processors cause the processors of an electronic device to perform the above method.

In yet another aspect, an electronic device includes one or more TSDs, a TTCON and an intra-panel interface. The one or more TSDs are configured to couple to a display panel that includes a plurality of display pixels and a plurality of touch sensors. The TTCON is configured to provide a display drive signal and a touch control signal. The display drive signal includes display content data and display control data, the touch control signal including an instruction to initiate an operation mode on the one or more TSDs or the plurality of touch sensors. The intra-panel interface includes a plurality of forward links and a set of backward links. The forward link includes a first subset of display forward links and a second subset of touch forward links. The forward and backward links are coupled between the TTCON and the one or more TSDs. The TTCON is configured to send the display drive signal to the one or more TSDs over the first subset of display forward links and send the touch control signal to the one or more TSDs over the second subset of touch forward links. The one or more TSDs are configured to in response to receiving the touch control signal, identify the instruction to initiate the operation mode in the touch control signal, generate touch data according to the operation mode, and return the touch data to the TTCON via the set of backward links.

BRIEF DESCRIPTION OF DRAWINGS

The disclosed embodiments have other advantages and features, which will be more readily apparent from the detailed description, the appended claims, and the accompanying figures (or drawings). A brief introduction of the figures is below.

DETAILED DESCRIPTION

The figures and the following description relate to embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
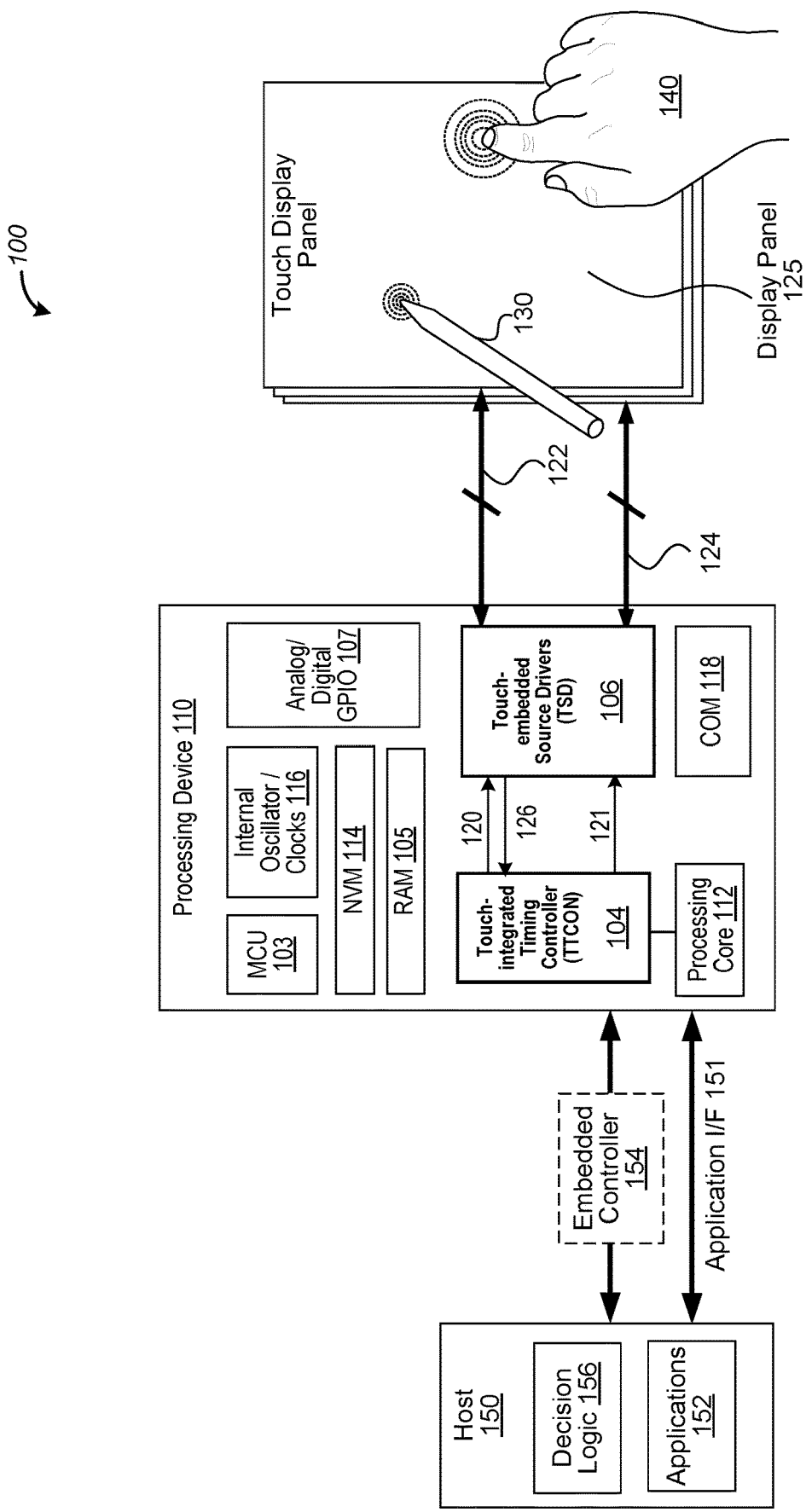
FIG. 1 is a block diagram of an electronic system, in accordance with some embodiments.

FIG. 1 is a block diagram of an electronic system 100, in accordance with some embodiments. In the electronic system 100, a processing device 110 is electrically coupled to a display panel 125 including a display pixel array. The display pixel array further includes a plurality of display pixels, a plurality of control lines, and a plurality of data lines. Each display pixel is powered between a display power supply and a ground supply. The processing device 110 operates in a display driving mode in which a drive voltage is generated to drive a data line of each display pixel to enable display of a corresponding color on the respective display pixel with a respective luminance level. In some embodiments, the processing device 110 includes a processing core 112 that provides display information (e.g., display content data of a sequence of image frames) to a touch-integrated timing controller (TTCON) 104 and touch-embedded source drivers (TSDs) 106, such that the TSDs 106 can drive individual display pixels in the display panel 125 to display images or video clips based on the display information. In some embodiments, the processing core 112 includes some or all functions of the TTCON 104 and TSDs 106 (i.e., part or all of the TTCON 104 and TSDs 106 is integrated in the processing core 112). Further, in the depicted embodiment, the display pixel array of the display panel 125 is coupled to the processing device 110 via a bus 124, and configured to receive display driving signals (e.g., the drive voltages) from the processing device 110 via the bus 124. More specifically, the display driving signals are generated by the TSDs 106 of the processing device 110 and provided to the display panel 125 via the bus 124.

In some embodiments, the display panel 125 further includes a touch sense array (e.g., a capacitive sense array), and the processing device 110 can also operate in a touch sensing mode in addition to the display driving mode. Optionally, the touch sense array is formed on the same layer of electrically conductive material that coats the bottom surface of the top encapsulation layer and provides electrodes for the display pixel array. Optionally, the touch sense array is formed on an alternative layer of conductive material that is distinct from the layer of electrically conductive material providing the common electrodes for the display pixel array. The processing device 110 is configured to measure capacitance variations at the touch sense array and detect one or more touches proximate to a surface of the display panel 125. In some embodiments, the processing device 110 alternates between the display driving mode and the touch sensing mode according to a predetermined duty cycle (e.g., 80% in the display driving mode) for the display driving mode, and detects a contact with or a proximity to a touch sensing surface associated with the display pixel array without interfering with display operations of the display pixel array. Conversely, in some embodiments, the processing device 110 operates in the display driving mode and in the touch sensing mode independently of each other via the display pixel array and touch sense array, respectively.

In the touch sensing mode, capacitive touch sensors in the touch sense array may be used to allow the TSDs 106 of the processing device 110 to measure self-capacitance, mutual capacitance, or any combination thereof. In the depicted embodiment, the touch sense array is coupled to the processing device 110 via a bus 122, and configured to provide touch sense signals to the TSDs 106 of the processing device 110 via the bus 122. By these means, the processing device 110 detects the presence of a touch object 140, the presence of a stylus 130, or any combination thereof on the touch sense array. In an example, the touch object is an active stylus 130. The active stylus 130 operates as a timing master, and the processing device 110 adjusts the timing of the touch sense array to match that of the active stylus 130.

In some embodiments, the processing device 110 includes analog and/or digital general purpose input/output ("GPIO") ports 107. The GPIO ports 107 may be programmable. The GPIO ports 107 may be coupled to a Programmable Interconnect and Logic ("PIL"), which acts as an interconnect between the GPIO ports 107 and a digital block array of the processing device 110 (not shown). In some embodiments, the digital block array is configured to implement a variety of digital logic circuits (e.g., DACs, digital filters, or digital control systems) using configurable user modules ("UMs"). The digital block array may be coupled to a system bus. The processing device 110 may also include memory, such as random access memory ("RAM") 105 and non-volatile memory ("NVM") 114. The RAM 105 may be static RAM ("SRAM"). The non-volatile memory 114 may be flash memory, which may be used to store firmware (e.g., control algorithms executable by the processing core 112 to implement operations described herein). The processing device 110 may also include a memory controller unit ("MCU") 103 coupled to the memory and to the processing core 112. The processing core 112 is a processing element configured to execute instructions or perform operations. The processing device 110 may include other processing elements as would be appreciated by one of ordinary skill in the art having the benefit of this disclosure. It should also be noted that the memory may be internal to the processing device 110 or external to it. In the case of the memory being internal, the memory may be coupled to a processing element, such as the processing core 112. In the case of the memory being external to the processing device 110, the processing device 110 is coupled to the other device in which the memory resides as would be appreciated by one of ordinary skill in the art having the benefit of this disclosure. Some or all of the operations of the processing core 112 may be implemented in firmware, hardware, software, or some combination thereof.

In some embodiments, the touch-integrated timing controller (TTCON) 104 coupled to the processing core 112 is configured to generate a touch control signal 120 and a display drive signal 121. The touch control signal 120 and display drive signal 121 are applied to the TSDs 106 to detect touch locations and drive individual display pixels, respectively. Specifically, the touch control signal 120 is used to enable the touch sensing mode in which self or mutual capacitance of touch sensors of the touch sense array is optionally scanned by the TSDs 106. Touch data 126 are returned from the TSDs 106 to the TTCON 104. One or more touch locations are thereby detected if one or more objects touch a touch sensing surface of the electronic system 100. Alternatively, in some embodiments, the display drive signal 121 includes display content data and display control data, and is used to enable the display driving mode. In such a display driving mode, the TSDs 106 provide a drive voltage to each display pixel of the display pixel array based on the display content data. The display pixel displays an intended color with a certain luminance level upon receiving the drive voltage.

Optionally, the touch control signal 120 and the display drive signal 121 are time-multiplexed, and transmitted from the TTCON 104 to the TSDs 106 via the same forward link. Optionally, the touch control signal 120 and the display drive signal 121 are transmitted from the TTCON 104 to the TSDs 106 via distinct and different forward links, and thereby, processed by the TSDs 106 independently of each other (e.g., during two separate durations of time, concurrently during the same duration of time). As such, in some embodiments, an intra-panel communication interface between the TTCON 104 and TSDs 106 includes a set of display forward links, a set of touch forward links, and a set of backward links.

The processing device 110 may also include an analog block array (not shown) (e.g., a field-programmable analog array). The analog block array is also coupled to the system bus. An analog block array may be configured to implement a variety of analog circuits (e.g., ADCs or analog filters) using, in some embodiments, configurable universal machines. The analog block array may also be coupled to the GPIO 107.

The processing device 110 may include internal oscillator/clocks 116 and a communication block ("COM") 118. In some embodiments, the processing device 110 includes a spread-spectrum clock (not shown). The oscillator/clocks 116 provides clock signals to one or more of the components of processing device 110. The communication block 118 may be used to communicate with an external component, such as an application processor 152, via an application interface ("I/F") line 151. In some embodiments, the processing device 110 may also be coupled to an embedded controller 154 to communicate with the external components, such as a host 150. In some embodiments, the processing device 110 is configured to communicate with the embedded controller 154 or the host 150 to send and/or receive data.

The processing device 110 may reside on a common carrier substrate such as, for example, an integrated circuit ("IC") die substrate, a multi-chip module substrate, or the like. In some embodiments, the components of the processing device 110 may be one or more separate integrated circuits and/or discrete components. In some embodiments, the processing device 110 may be one or more other processing devices known by those of ordinary skill in the art, such as a microprocessor or central processing unit, a controller, a special-purpose processor, a digital signal processor ("DSP"), an application specific integrated circuit ("ASIC"), a field programmable gate array ("FPGA"), or the like.

It is also noted that the embodiments described herein are not limited to having a configuration of a processing device coupled to an application processor, but may include a system that measures the capacitance on the touch sense array and sends the raw data to a host computer 150 where it is analyzed by an application. In effect, the processing that is done by the processing device 110 may also be done in the application processor. Specifically, in some embodiments, instead of performing the operations of the processing core 112 in the processing device 110, the processing device 110 may send the raw data or partially-processed data to the host 150. The host 150, as illustrated in FIG. 1, may include decision logic 156 that performs some or all of the operations of the processing core 112. Operations of the decision logic 156 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing core 112 may be implemented in the decision logic 156, the applications 152, or in other hardware, software, and/or firmware external to the processing device 110. In some other embodiments, the processing device 110 is the host 150.

Each of the TTCON 104 and TSDs 106 may be integrated into the IC of the processing device 110, or in a separate IC that is optionally disposed in proximity to the display panel 125. In some embodiments, descriptions of the TTCON 104 and TSDs 106 may be generated and compiled for incorporation into other integrated circuits. For example, behavioral level code describing the TTCON 104 or TSDs 106, or portions thereof, may be generated using a hardware descriptive language, such as VHDL or Verilog, and stored to a machine-accessible medium (e.g., CD-ROM, hard disk, floppy disk, or flash memory). Furthermore, the behavioral level code can be compiled into register transfer level ("RTL") code, a netlist, or a circuit layout and stored to a machine-accessible medium. The behavioral level code, the RTL code, the netlist, and the circuit layout may represent various levels of abstraction to describe the TTCON 104 or TSDs 106.

It is noted that the components of the electronic system 100 may include all of the components described above. In some embodiments, the electronic system 100 includes fewer than all of the components described above. In some embodiments, the electronic system 100 is used in a tablet computer. In some embodiments, the electronic device is used in other applications, such as a desktop computer, a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a global position system ("GPS"), or a control panel. The embodiments described herein are not limited to touch screens or touch-sensor pads for notebook embodiments.

Figure 2:
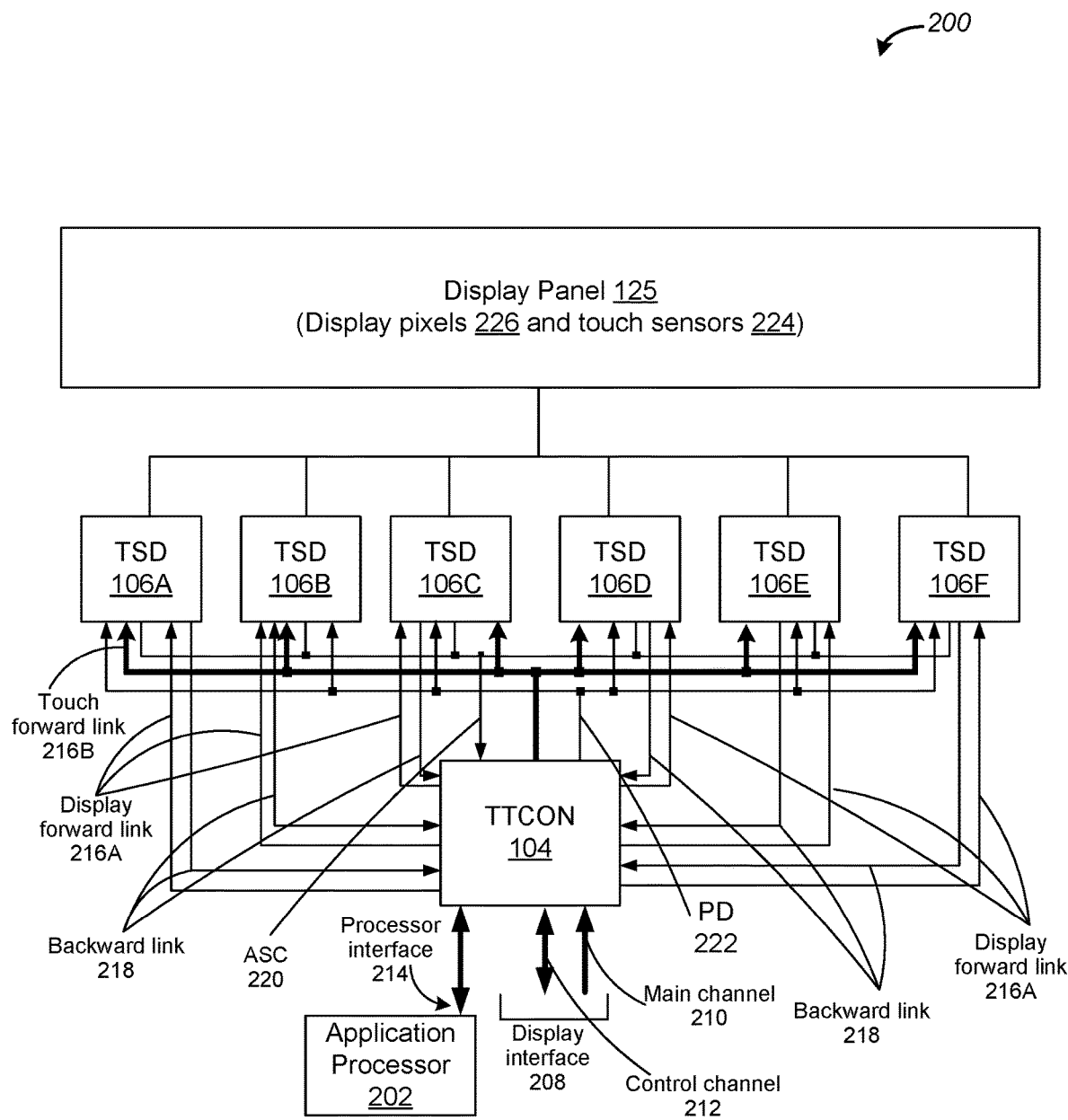
FIG. 2 is a block diagram illustrating a touch panel display subsystem having a scalable intra-panel interface (SIPI) between a touch-integrated timing controller (TTCON) and touch-embedded source drivers (TSDs), in accordance with some embodiments.

FIG. 2 is a block diagram illustrating a touch panel display subsystem 200 including a scalable intra-panel interface (SIPI) between a touch-integrated timing controller (TTCON) 104 and touch-embedded source drivers (TSDs) 106, in accordance with some embodiments. The touch panel display subsystem 200 includes one or more of: the TTCON 104, the one or more TSDs 106, a plurality of forward links 216, a set of backward links 218, an auxiliary status channel (ASC) 220, a power management bus (PD)

222, a plurality of touch sensors 224, and a plurality of display pixels 226. The TTCON 104 receives display content data and control data from a source device (e.g., a processing core 112 in FIG. 1), and generates a display drive signal and a touch control signal to provide the display content data and control data to TSDs 106. The TTCON 104 includes a display interface 208 for receiving the display content data and control data. The plurality of forward links 216 and the set of backward links 218 form a bi-directional (SIPI) between the TTCON 104 and the TSDs 106 of the touch panel display subsystem 200.

The display interface 208 receives the display content data from the source device for display on the display panel 125. The display content data may include one or more combination of video, image data, and audio data of various formats. The control data received via the display interface 208 includes address, timing, and other control information used by the TTCON 104 to control the operation of the TSDs 106 or send display status data 126 from one or more TSDs 106 to the TTCON 104. In an example, a TSD 106 is embodied in an integrated circuit, die, or computing device included within a system that includes the touch panel display subsystem 200. In another example, a TSD 106 is part of an external computing system, such as a set-top box, digital video disk player, or other external computing device that generates display content data and control data suitable to be received by the TTCON 104 over the display interface 208. In some embodiments, the display interface 208 is included in a graphics processing unit (GPU).

In some embodiments, the display interface 208 includes a main channel 210 and a control channel 212. The main channel 210 carries the display content data for display on the display panel. The control channel 212 carries the control data that is associated with the display content data and transferred via bi-directional communication between each of the TSDs 106 and the TTCON 104. Example control data includes training information, and test and debug information. The control channel 212 also carries status information, including data error rate as measured at one or a combination of the TSD 106 and the TTCON 104. In some embodiments, the control channel 212 carries the display control data used by the display drive signal 121, and the display control data includes one or more of: vertical timing signals (e.g., vertical sync (VSYNC) or frame pulse (FP)), horizontal timing signals (e.g., horizontal sync (HSYNC) or line pulse (LP)), and global timing signals (e.g., display refresh signals for refreshing a displayed image, clock signals for operating gate drivers, and clock and latch enable for operating TSDs 106).

The processor interface 214 of the TTCON 104 supports bi-directional communication between an application processor 202 and the TTCON 104. The application processor 202 supports applications running in an operating system environment. Example applications include applications displaying content on the display panel 125 for interaction with a user. For example, the application processor 202 interprets actions associated with interactions with content displayed in the display panel. Example actions may include navigation, content selection, or any other suitable action interacting with the display content. In some embodiments, the application processor 202 is combined with the display interface 208. For example, the application processor 202 may be embedded in the GPU core having a display interface 208. In some embodiments, the TTCON 104 receives application data from the application processor 202 via the processor interface 214 and transmits touch sensor data received from one or more TSDs 106 to the application processor 202 for further processing. In some embodiments, the TTCON 104 receives one or more touch controller commands from an external processor via the processor interface 214 to regulate the transmission of touch data 120 from the TSDs 106 to the TTCON 104, as further described in FIG. 4.

The ASC 220 of the TTCON 104 is a single line communication link that enables the TSDs 106 to provide status information to the TTCON 104. Example status information includes link information such as symbol lock status or symbol error count. The ASC 220 is shared by multiple TSDs 106 through a multi-drop configuration. In some embodiments, a single ASC 220 connects all of the TSDs 106 in the touch panel display subsystem to a single TTCON 104. In another embodiment, multiple ASCs 220 may be used, with each ASC 220 connected to a subset of TSDs 106. In addition, multiple TTCONs 104 may be used to communicate with TSDs through multiple ASCs 220.

The PD 222 of the TTCON 104 enables the TTCON 104 to send power control information to control the operation state of the TSDs 106.

The SIPI of the TTCON 104 includes a plurality of forward links 216 and a set of backward links 218. Each of the links 216 and 218 operates in accordance with an SIPI standard. The plurality of forward links 216 transmits display content data and control data from the TTCON 104 to each TSD 106. The plurality of forward links 216 includes one or more data channels, each data channel embodied as a differential pair of conductors. In some embodiments, the one or more data channels are DC-coupled differential pairs with double termination. In some embodiments, the number of data channels included in the forward links 216 is scalable. In an example, the plurality of forward links 216 includes two data channels. The number of data channels may be greater than two to satisfy the maximum transmission throughput used for a specific implementation of the touch panel display subsystem 200.

Further, the plurality of forward links 216 includes a first subset of display forward links 216A and a second subset of touch forward links 216B for the purposes of transmitting display-related data and control signals separately from touch-related control signals. That said, the first subset of display forward links 216A is used to transmit a display drive signal 121 including display content data and display control data, and the second subset of touch forward links 216B is used to transmit a touch control signal 120, independently of the display forward links 216A. Each display forward link is coupled between the TTCON 104 and a respective TSD 106A to provide distinct display content data and control data to the respective TSD 106A. In contrast, in some embodiments, the set of touch forward links 216B is a multi-drop communication link coupled between the TTCON 104 and the TSDs 106 to provide the TSDs 106 with the same touch control signal 120.

In some embodiments, each backward link 218 includes a single differential pair of signal conductors that transmit touch data from each TSD 106 to the TTCON 104. In some embodiments, the digital data transmitted over each backward link 218 includes touch data 126 (e.g., touch-related confirmation data, status data, touch sensor data) received from the touch sensors 224. In some embodiments, each backward link 218 has similar and identical electrical characteristics to each of the forward links 216.

Each TSD 106 receives multi-bit digital display content data and control data from the TTCON 104 via the forward links 216, converts the display content data to analog voltage levels, and provides the analog voltage levels to pixels in the display panel 125. The transmission path formed by the output of each TSD 106 to the input of each pixel in a specific column of pixels is referred to herein as an output channel or channel. A TSD 106 includes multiple output buffers, where each output buffer operates to rapidly charge the column line capacitance of the corresponding channel. The TSD 106 also receives touch sensor data from one or more touch sensors 224 and sends the received touch sensor data to the TTCON 104 via the respective backward link 218 for further processing. In some embodiments, a group of TSDs 106 is coupled to a single touch sensor 224.

Each touch sensor 224 measures physical interactions with a portion of the display panel and obtains information describing location, position, force, and interaction duration information of the physical interaction with the display panel. For example, when an object (e.g., a finger) touches the display panel, the touch sensor 224 measures an analog signal indicating the physical interaction, and the analog signal is converted into digital data (i.e., touch data 126), in a corresponding TSD 106. The touch data 126 is then transmitted to the TTCON 104 over a corresponding backward link 218 for further processing. Touch information can be extracted in the TTCON 104 from the touch data 126. Example touch information includes position of a touch event relative to reference point on the display panel 125, force applied on the display panel 125, and touching duration indicating the duration of the touch event. The touch sensor 224 may employ well-known methods, including resistive and capacitive elements to detect a touch event. In some embodiments, the touch sensors 224 are integrated with a transparent touch-sensitive material disposed on the display panel. Alternatively, the touch sensors 224 may be integrated into the display panel 125. The number of touch sensors 224 varies based on the size of a display area and a size of each touch sensor. Each touch sensor 224 is coupled to a group of column drivers that are placed physically in proximity to the touch sensor 224.

Figure 3:
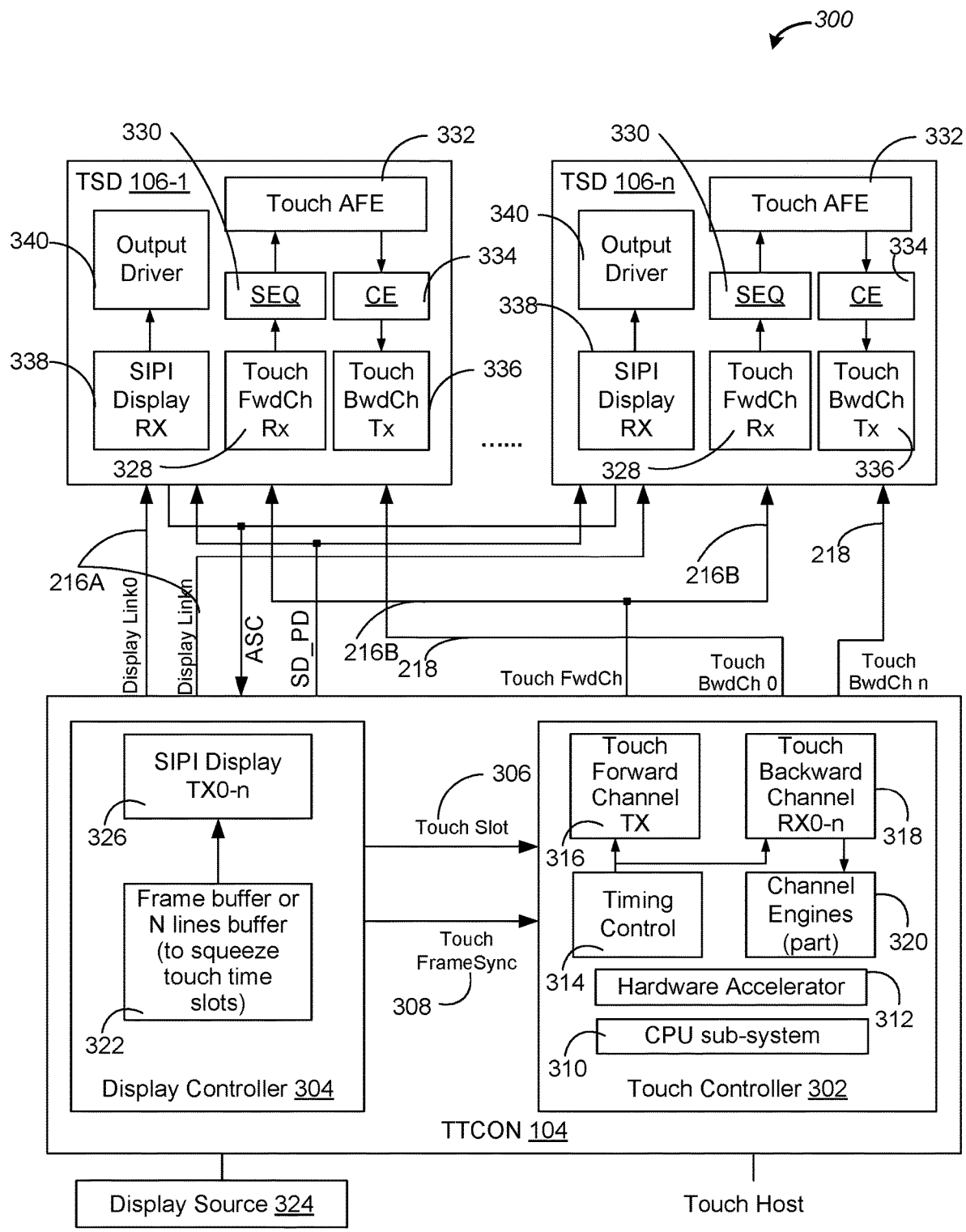
FIG. 3 is a block diagram of a touch panel display subsystem having a TTCON and TSDs, in accordance with some embodiments.

FIG. 3 is a block diagram of a touch panel display subsystem 300 having a TTCON 104 and a plurality of TSDs 106, in accordance with some embodiments. The TTCON 104 and TSDs 106 are coupled to each other via an intra-panel interface including at least a set of display forward links 216A, a set of touch forward links 216B, and a set of backward links 218. Specifically, the TTCON 104 is coupled to each TSD 106 via a display forward link 216A, a touch forward link 216B, and a backward link 218. For each TSD 106, the display forward link 216A is configured to transmit a display drive signal 121 including display content data and display control data. For each TSD 106, the touch forward link 216B is distinct from the display forward link 216A and configured to transmit a touch control signal 120 including an instruction to initiate an operation mode on the one or more TSDs or the plurality of touch sensors 224, and the backward link 218 is configured to return the touch data 126 generated according to the operation mode to the TTCON 104. The display drive signal 121 transmitted via the display forward link 216A and the touch data 126 returned via the backward link 218 are distinct for each TSD 106, and therefore, each of the display forward link 216A and backward link 218 is a point-to-point link. In some embodiments, each touch forward link 216B is a point-to-point link. Alternatively, in some embodiments, the touch control signal 120 is address aware and each TSDs 106 has address assigned, and the touch forward link 216B is a multi-drop link connecting the TTCON 104 to all TSDs 106.

The touch forward link 216B is used to deliver touch configuration, touch timing control, and touch power control. For example, the touch control signal 120 passed by the touch forward link 216B is used to enable functions including, but are not limited to, dividing a touch receiver clock for a touch clock, dividing self synchronization by a dedicated k-code, synchronizing operations of the touch sensors 224 and active stylus 130, synchronizing a touch clock divider (e.g., a divider 450A in FIG. 4), reading the touch data 126, configuring a touch analog frontend (AFE) (e.g., a touch AFE 332 in FIG. 3), and providing a touch backward channel clock source. In contrast, the touch data 126 collected via the backward link 218 includes, but is not limited to, touch sensor data, data concerning a touch forward link quality, a debug status, and a touch forward link lock/unlock indicator.

In some embodiments, commands, configurations and instructions/requests are sent by the TTCON 104 through the forward links 216 only. From a system control perspective, the TTCON 104 is a master, and the TSDs 106 are slaves subject to the control of the TTCON 104.

The TTCON 104 includes a touch controller 302 and a display controller 304 configured to control the TSDs 106 to measure touch sense data from the touch sensors 224 and drive the display pixels 226, respectively. In some embodiments, display driving and touch sensing are synchronized, e.g., time-multiplexed with respective duty cycles. The display controller 304 sends a touch slot signal 306 or a touch frame synchronization signal 308 to synchronize itself with the touch controller 302 based on a slot or an image frame, respectively. Optionally, each slot corresponds to a short duration of time separating two rows of display content data, and touch sensing is implemented in the short duration of time. A complete scan of the touch sensors 224 is conducted in a single slot or a plurality of slots separating multiple rows of display content data.

The touch controller 302 includes a CPU sub-system 310, a hardware accelerator 312, a timing control module 314, a touch forward channel transmitter 316, a plurality of touch backward channel receivers 318, and a channel engine 320. The CPU subs-system 310, hardware accelerator 312, and channel engines 320 are collectively called a touch sensing engine 460 in FIG. 4. A touch control signal 120 is generated by the timing control module 314, and sends to the TSDs 106 via the touch forward channel transmitter 316. Touch data 126 returned by the TSDs 106 are received by the touch backward channel receivers 318, and provided to channel engine 320 for further processing, e.g., identifying one or more touch events on different areas of a touch sensing surface of the display panel 125.

The touch forward channel transmitter 316 is coupled to a touch forward channel receiver 328 of each TSD 106, and configured to transmit the touch control signal 120 to the touch forward channel receiver 328, e.g., in a serial data format. Each TSD 106 further includes a deserialization module 330, a touch AFE 332, a channel engine 334, and a touch backward channel transmitter 336. The deserialization module 330 is configured to convert the touch control signal 120 to internal touch control signals or recover a touch clock signal locally. The internal touch control signals and the touch clock signal are used to control the touch AFE 332 to measure touch sense data from the touch sensors 224 in the display panel 125, e.g., scanning a subset or all touch sensors 224. The touch sense data is captured by the touch AFE 332 and pre-processed in the channel engine 334 before it is passed to the touch backward channel transmitter 336. The touch backward channel transmitter 336 is coupled to a respective touch backward channel receiver 318 of the touch controller 302 via a respective backward link 218, thereby returning the touch sense data to the touch controller 302 via the respective backward link 218.

In contrast, the display controller 304 of the TTCON 104 includes a buffer unit 322 (e.g., a frame buffer or a plurality of line buffers) and a plurality of display intra-panel transmitters 326. The buffer unit 322 is configured to store display content data received from a display source 324 in frame or in line. The display intra-panel transmitters 326 are configured to extract the display content data in the frame buffer or line buffers 322 and send the display content data to the display forward links 216A coupled to the TSDs 106. On the TSD side, each TSD 106 has a display intra-panel receiver 338 coupled to a respective display forward link 216A and configured to receive a subset of display content data corresponding to the respective TSD 106. A display output driver 340 is configured to receive the subset of display content data from the display intra-panel receiver 338 and drive a subset of the display pixels 226 using the subset of display content data, thereby allowing still images or video clips associated with the display content data to be displayed on the display panel 125.

Figure 4:
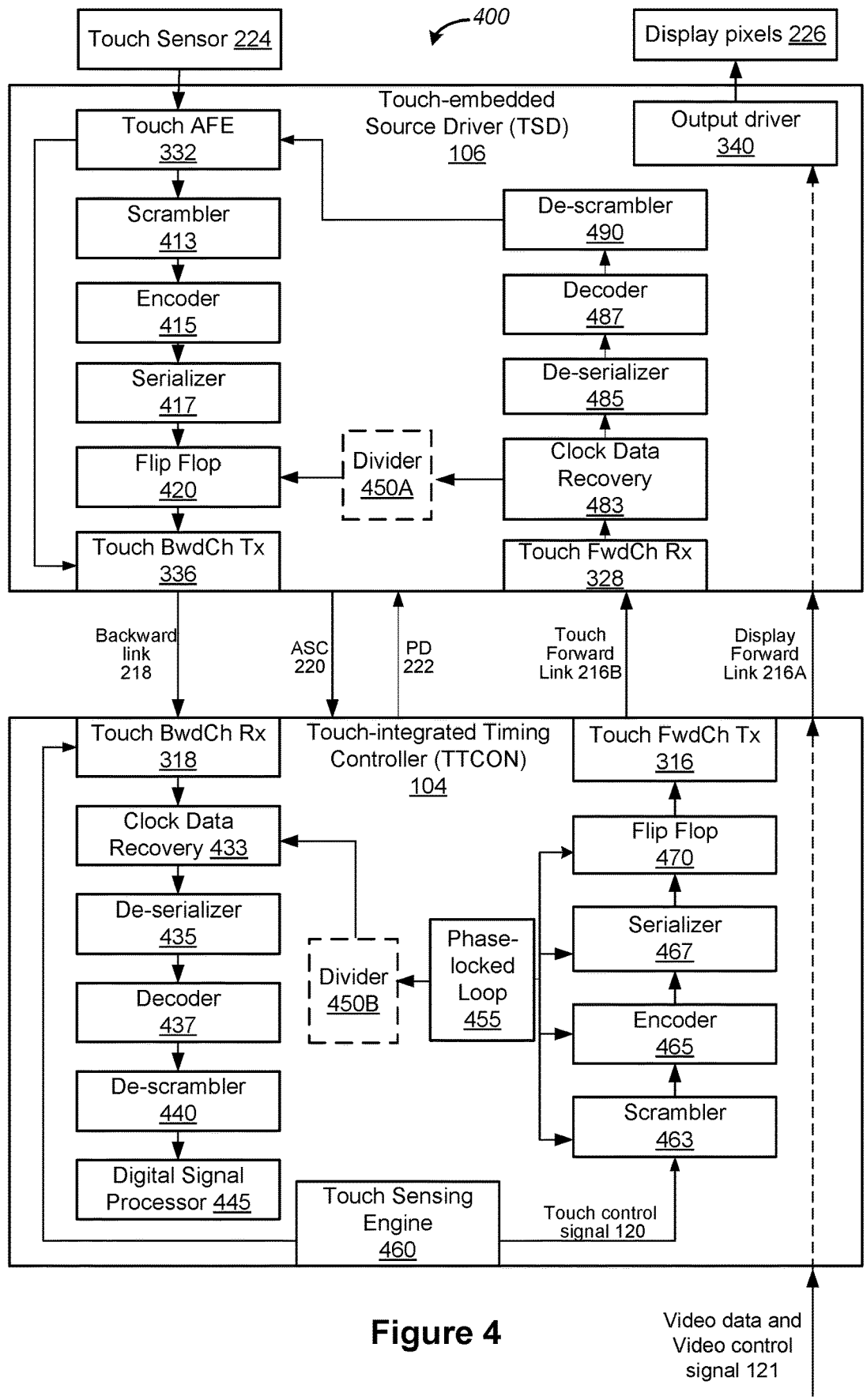
FIG. 4 is a block diagram of a touch panel display subsystem in which a TTCON is coupled to a single TSD via an intra-panel interface, in accordance with some embodiments.

FIG. 4 is a block diagram of a touch panel display subsystem 400 in which a TTCON 104 is coupled to a single TSD 106 via an intra-panel interface, in accordance with some embodiments. Multiple TSDs 106 may be coupled to the TTCON 104. A single TSD 106 may be coupled to multiple touch sensors 224, and multiple TSDs 106 may be coupled to a touch sensor 224. For simplicity, in FIG. 4, one TTCON 104 and one TSD 106 are used to describe the forward link signal paths and backward link signal paths. Similar signal paths may be employed to an implementation including multiple TSDs 106 and multiple touch sensors 205.

The TTCON 104 corresponds to a plurality of forward link paths and a plurality of backward link paths. The plurality of forward link paths includes a display forward link path and a touch forward link path coupled to each TSD 106. The touch forward link path includes a touch sensing engine 460, a scrambler 463, an encoder 465, a serializer 467, a flip flop 470, and a touch forward channel transmitter 316. The touch sensing engine 460 receives touch control data including one or more touch controller commands from an external processor via the processor interface 214 and generates a touch control signal 120 including the touch controller commands. The touch controller commands indicate an operation mode of the touch control signal 120. Examples of operation modes include a link establishment mode, an active operation mode, an idle operation mode, and a sleep operation mode. The active operation mode indicates the touch sensor 224 is selected for detecting touch events. The idle operation mode indicates no touch event is detected within a threshold time value but the touch sensor 224 is still active for detecting incoming touch events. The sleep operation mode indicates the touch sensor 224 is powered off or at a low power state and no touch event is detected. In some embodiments, the touch controller command is used to determine that a transmission of touch sensor data 126 is complete in a backward link path. In some embodiments, the touch sensing engine 460 is external to the TTCON 104.

In some embodiments, the touch sensing engine 460 generates a receiver control signal directly based on the one or more touch controller commands to enable or disable the touch backward channel receiver 318 included in the backward link path of the TTCON 104. For example, the touch sensing engine 460 generates a receiver control signal having a first state to enable the touch backward channel receiver 318 to receive information from the TSD 106 over the backward link when a touch controller command indicates the operation mode is an active operation mode. If the touch controller command indicates the operation mode is an idle or sleep operation mode, the touch sensing engine 460 generates a receiver control signal having a second state to maintain the touch backward channel receiver 318 in a disabled state or cause the touch backward channel receiver 318 to change state to a disable state. The touch sensing engine 460 may also generate a receiver control signal having a second state to disable the touch backward channel receiver 318 when a determination is made by the touch sensing engine 460 that transmission of the touch sensor data 126 from a TSD 106 over the backward link 218 is complete, as further described below.

In some embodiments, a touch controller command is used to determine if a transmission of the touch sensor data received from the touch sensor 224 is complete. The touch controller command includes, among other information, and indication of an expected amount of touch sensor data to be received from the touch panel. The TTCON 104 compares an amount of the touch data 126 returned by each TSD 106 or all TSDs 106 to a corresponding expected amount of touch sensor data. In accordance with a determination that the amount of the touch data is equal to or greater than the expected amount of touch sensor data, the TTCON 104 disables the backward link 218, e.g., by disabling the touch forward channel transmitter 316.

In some embodiments, the touch control signal 120 is generated based on the touch controller commands, and includes a packet representing a multi-bit signal. The packet is separate from display data and the display control signal 461 that are processed separately in the display forward link path including the display forward link 216A. In some embodiments, the touch control signal 120 is transmitted over the touch forward link 216B to the TSD 106 during a vertical blanking period, or during an intra-frame pause.

In some embodiments, the touch sensing engine 460 also generates touch calibration data for calibrating the operation of the touch sensor 224. The touch calibration data is optionally embedded in the touch control signal 120. Alternatively, in some embodiments, the touch sensing engine 460 sends the touch calibration data over the touch forward link 216B to the TSD 106 via a different signal line. Likewise, display calibration data may be included in the display signal 121 that are sent to the TSD 106 via the display forward link 216A or sent in a different signal line other than the display forward link 216A.

In the TTCON 104, the scrambler 463 scrambles the touch control signal 120 to generate scrambled touch control signal 120. The encoder 465 encodes the scrambled composite data to generate encoded touch control signal 120. The encoder 465 may employ various encoding schemes, including 8b/10b. The serializer 467 converts the encoded touch control signal 120 into serial encoded touch control signal 120 and sends the serial encoded touch control signal 120 to the touch forward channel transmitter 316 via the flip flop 470. The scrambler 463, the encoder 465, the serializer 467, and the flip flop 470 receive a clock signal from the phase-locked loop (PLL) 455. In some embodiments, the clock signal is embedded in the touch control signal 120. The touch forward channel transmitter 316 converts the serial encoded touch control signal 120 into differential serial encoded touch control signal 120, and transmits the differential serial encoded touch control signal 120 to the touch forward channel receiver 336 included in TSD 106 over the touch forward link 216B.

Referring to FIG. 4, the forward link components in the TSD 106 include a touch forward channel receiver 336, a clock data recovery circuit 483, a de-serializer 485, a decoder 487, a de-scrambler 490, and an output driver 340. The touch forward channel receiver 336 included in the TSD 106 converts the differential serial encoded touch control signal 120 received from the touch forward channel transmitter 316 via the touch forward link 216B into a serial bit stream encoded touch control signal 120. The clock data recovery circuit 483 recovers a touch clock signal from the serial encoded touch control signal 120. The recovered touch clock signal generally has the same clock rate as the clock signal extracted from the touch control signal 120 transmitted from the TTCON 104. For example, the recovered touch clock signal has the same clock rate as the clock signal output by the PLL 455 included in the TTCON 104. The de-serializer 485 receives the serial encoded touch control signal 120 from the clock data recovery circuit 483 and converts the serial encoded touch control signal 120 into a multi-bit parallel touch control signal 120. The decoder 487 receives the multi-bit parallel touch control signal 120 that is encoded from the de-serializer 485 and decodes the encoded touch control signal 120 to generate a decoded touch control signal 120. The de-scrambler 490 de-scrambles the decoded touch control signal 120 to generate descrambled touch control signal 120. In some embodiments, the descrambled touch control signal 120 is the same as the touch control signal 120 generated in the TTCON 104. The descrambled touch control signal 120 is used to control a touch sensing analog frontend (AFE) 332 to measure touch sensor data 126 from the touch sensor 224.

The backward link signal path in the TSD 106 includes the touch AFE 332, a scrambler 413, an encoder 415, a serializer 417, a flip flop 420, and a touch backward channel transmitter 336. The touch AFE 332 receives the touch control signal 120 from the de-scrambler 490. In some embodiments, the touch AFE 332 compares the operation mode specified by the touch control signal 120 with one or more settings data stored in the touch AFE 332 to determine whether to establish the backward link 218. Example settings may be a multi-bit value corresponding to an operation mode settings determined by the touch sensing engine 460. If the touch AFE 332 determines that the received touch control signal 120 indicates the active operation mode, the touch AFE 332 generates a transmitter control signal having a first state to enable the touch backward channel transmitter 336 to establish the backward link 218. On the other hand, if the touch AFE 332 determines that the received touch control signal 120 indicates an idle or sleep operation mode, the touch AFE 332 generates the control signal having a second state to disable the touch backward channel transmitter 336 to disestablish the backward link 218 or maintain the backward link 218 in a disconnected state. Although not shown in FIG. 4, in some embodiments, the touch AFE 332 may also enable or disable other components included in the TSD 106 in a similar manner with respect to the touch backward channel transmitter 336.

In some embodiments, the touch AFE 332 also drives the touch sensor 224 according to the touch control signal 120 received from the TTCON 104. For example, if the touch sensor 224 is a capacitive touch sensor, mutual capacitance is an amount of electrical charges between two electrodes. The touch AFE 332 charges the electrodes to generate an electrical field defined according to the touch control signal 120 between the two electrodes. When an object (e.g., a finger, or an instrument) contacts the touch sensor 224 via the display panel, the object acts as another charge conducting electrode to cause the mutual capacitance between the two electrodes to decrease. The touch AFE 332 receives the change of the mutual capacitance as a touch signal and converts the touch signal into voltage signals for further processing, e.g., being sampled and digitalized to touch data 126.

The touch AFE 332 disables the touch backward channel transmitter 336 if a transmission of the received touch sensor data is complete. In one example, the touch AFE 332 determines locally that the transmission of the received touch sensor data is complete using information received from the touch control signal 120 (e.g., a touch controller command indicating an expected amount of touch sensor amount). In one example, the received information indicates the expected amount of the touch sensor data to be transmitted by the touch sensor 224. The touch AFE 332 scans a corresponding portion of a touch panel to obtain touch sensor data 126. If the amount of the obtained touch sensor data matches the expected amount of touch sensor data indicated in the touch controller command, the touch AFE 332 disables the touch backward channel transmitter 336. In some embodiments, the touch AFE 332 also disables other backward link components in the TSD 106 (e.g., the scrambler 413, the encoder 415 and the serializer 417) in accordance with a determination that the transmission of received touch sensor data is complete.

In the TSD 106, each of the scrambler 413, encoder 415, serializer 417, flip flop 420, and touch backward channel transmitter 336 operates in manner similar to the counterpart circuits included in the touch forward path of the TTCON 104. The scrambler 413 receives the converted touch sensor data 126 outputted by the touch AFE 332, and scrambles the touch sensor data and control signals from the touch AFE 332 to generate scrambled touch sensor data. The encoder 415 encodes the scrambled touch data 126 to generate encoded touch sensor data. The serializer 417 converts the encoded touch data 126 into serial encoded touch sensor data, and sends the serial encoded touch data 126 to the touch backward channel transmitter 336 via the flip flop 420. The flip flop 420 receives the recovered touch clock signal from the clock data recovery circuit 483 via the divider 450A and sends retimed touch sensor data signal 126 to the touch backward channel transmitter 336. The divider 450A performs a divide operation on the recovered touch clock to generate a divided recovered clock with a reduced clock rate (also referred to as a sub-rate) based on the divide ratio. The divide ratio of the divider 450A may be set to match the divide ratio of the divider 450B included in the TTCON 104. In other embodiments, the recovered clock is passed to the flip flop 420 without use of a divider 450A. The touch backward channel transmitter 336 converts the retimed serial encoded touch sensor data into differential serial encoded touch sensor data and transmits the differential serial encoded touch sensor data over the backward link 218.

The backward link components in the TTCON 104 include a touch backward channel receiver 318, a clock data recovery circuit 433, a de-serializer 435, a decoder 437, a de-scrambler 440, and a digital signal processor 445. The touch backward channel receiver 318 included in the TTCON 104 receives the differential serial encoded touch sensor data and generates serial encoded touch sensor data. The touch sensing engine 460 generates a receiver control signal having a second state to disable the touch backward channel receiver 318 to disestablish the backward link 218. In some embodiments (not shown in FIG. 4), the touch sensing engine 460 may also disable other components (e.g., the touch backward channel receiver 318, the clock data recovery 233, the de-serializer 435, the decoder 437, the de-scrambler 440, and the digital signal processor 445) included in the backward link of the TTCON 104 in a similar manner with respect to the touch backward channel receiver 318.

The clock data recovery circuit 433 recovers the touch clock signals from the serial encoded touch data 126 using the clock signal from the PLL 455 via the divider 450B. The touch sensor data output by the clock data recovery circuit 433 is retimed at the same clock rate of the clock output by the PLL 455, which matches the clock rate of the touch sensor data 126 transmitted by the touch backward channel transmitter 336 over the backward link 218. The de-serializer 435 converts the retimed serial encoded touch sensor data into multi-bit parallel encoded touch sensor data. The decoder 437 decodes the multi-bit parallel encoded touch sensor data to generate decoded touch data 126. The de-scrambler 440 de-scrambles the decoded touch sensor data to generate descrambled touch sensor data. The digital signal processor 445 (also referred to as a touch signal processor) processes the touch sensor data for further analysis. For example, the digital signal processor 445 analyzes the received touch sensor data to create a touch event by determining touching position, touching force applied on the display panel, angle of the touching force, magnitude of the touching force, touching duration, and other types of the touch events. Touch sensor data may also include information indicating the type of instrument involved in the touch event, such as finger, glove, pen or other instrument applied on the display panel. In some embodiments, the digital signal processor 445 performs initial process of the touch sensor data 126. The initial process of the touch sensor data 126 includes filtering out some unwanted components or features of the touch sensor data 126, enhancing some components or features of the touch sensor data 126, compressing or down-sampling the touch sensor data 126, or other suitable process used for digital signal processing. The digital signal processor 445 transmits the processed touch sensor data 126 to the touch sensing engine 460 for creating the touch event. In some embodiments, the digital signal processor 445 is embedded in the touch sensing engine 460. After the touch sensor data 126 is processed, the touch sensing engine 460 transmits the processed touch sensor data 126 to the application processor 202 (not shown in FIG. 4).

Figure 5A:
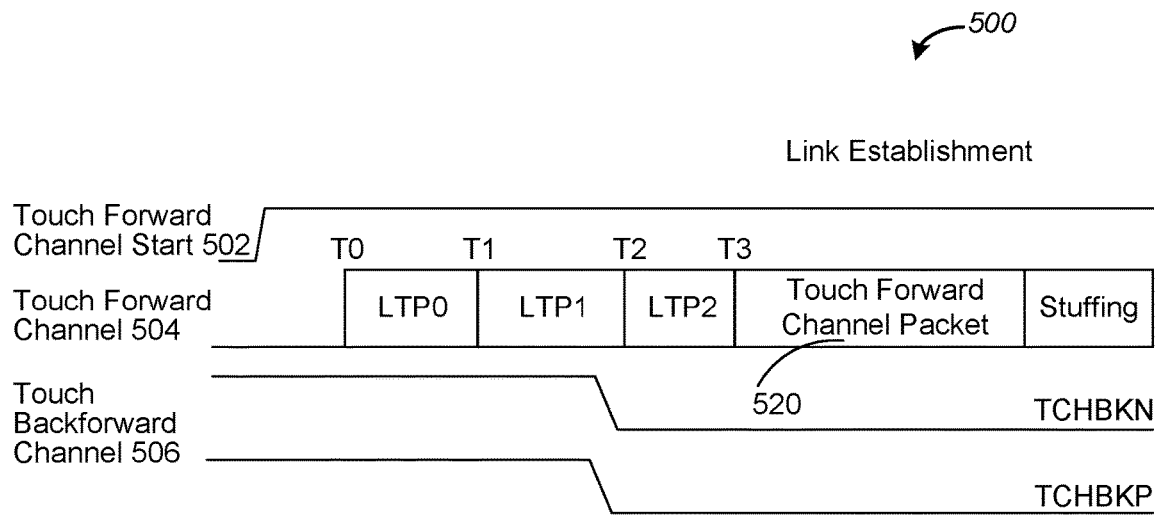
FIG. 5A is a time diagram of a touch forward channel start signal 502, a touch link establishment signal, and a touch backward channel signal that vary during a link establishment process, in accordance with some embodiments.

FIG. 5A is a time diagram 500 of a touch forward channel start signal 502, a touch link establishment signal 504, and a touch backward channel signal 506 that vary during a link establishment process, in accordance with some embodiments. Every time when a display panel 125 is powered on and before touch sensor data 126 can be measured and returned to the TTCON 104, the forward and backward links 216 and 218 are initialized, trained and established. That said, each TSD 106 also has three stages including an initializing state, a link training state and a normal operation state. In the initializing state, both the touch AFE 332 and PLL 455 are being prepared to reach a desired condition for measuring and transmitting touch sense data 126, while the touch backward channel transmitter 336 outputs a default signal level (e.g., a low level "L") in the touch forward channel start signal 502.

After an output of the PLL 455 is locked, the touch forward channel transmitter 316 of the TTCON 104 changes to the link training state in which the touch forward channel transmitter 316 sends a low frequency clock LTP0 (e.g., having 4-16 cycles at a frequency of 4 MHz) to reset the touch forward channel receiver 328 in the TSDs 106, and sends a touch clock recovery signal LTP1 continuously to the touch forward channel receivers 328 until the receivers 328 are locked. In this link training stage, the touch forward channel receivers 328 start clock recovery and phase alignment. The touch forward channel receivers 328 of the TSDs 106 are locked, indicating that clock recovery and phase alignment are completed. The touch forward channel transmitter 316 then sends a validity check signal LTP 2 to verify alignment. If there is no error (invalid code or running disparity error) detected in response to LTP2, the TTCON 104 goes to a normal operation state and the forward and backward links 216 and 218 are thereby established. As such, the touch link establishment signal 504 includes LTP0, LTP1, LTP2, and a touch forward channel packet, and is sent from the TTCON 104 to the TSD 106 to establish the touch forward link 216B.

The touch forward channel link establishment starts with link reset based on LTP0 sent via the touch forward link 216B, then the link starts bit and symbol synchronization establishment. Link symbols transmitted by the touch forward channel transmitter 316 in this stage are a repetition of K28.7-(LTP1) and touch forward channel receivers 328 should set lock signal high after it achieves both bit synchronization and symbol lock. When detecting lock signals from touch forward channel receivers in all TSDs 106, (e.g., TCHBKP and TCHBKN of the touch backward channel signal 506 are low), the touch forward channel transmitter 316 starts to send consecutive LTP2 to allow touch forward channel receiver to check a symbol boundary and determine if the touch forward link 216B is established correctly. In some embodiments, the minimum symbol number for LTP2 is 320.

Figure 5B:
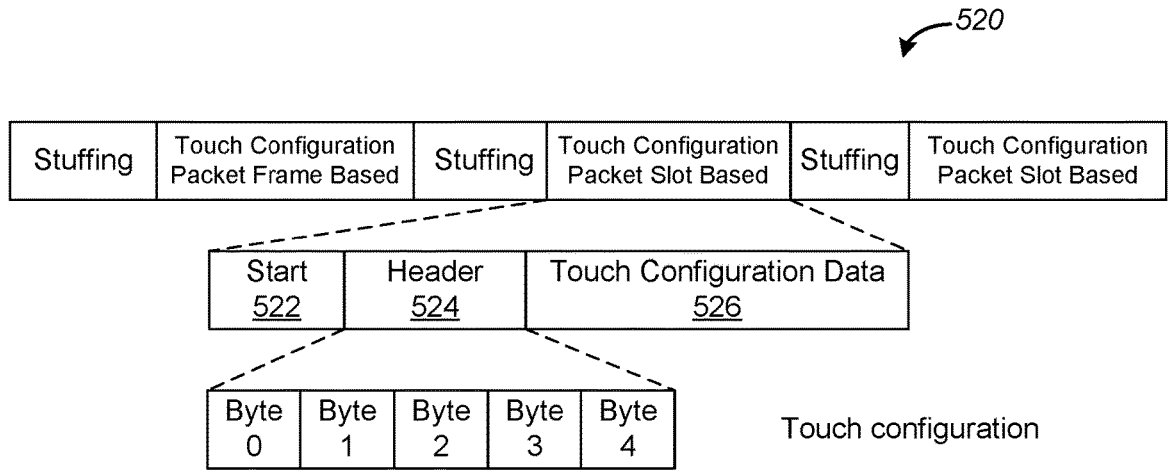
FIGS. 5B and 5C illustrate data structures of a touch sensing configuration packet and a timing and power control packet transmitted over a touch forward link, in accordance with some embodiments.
Figure 5C:
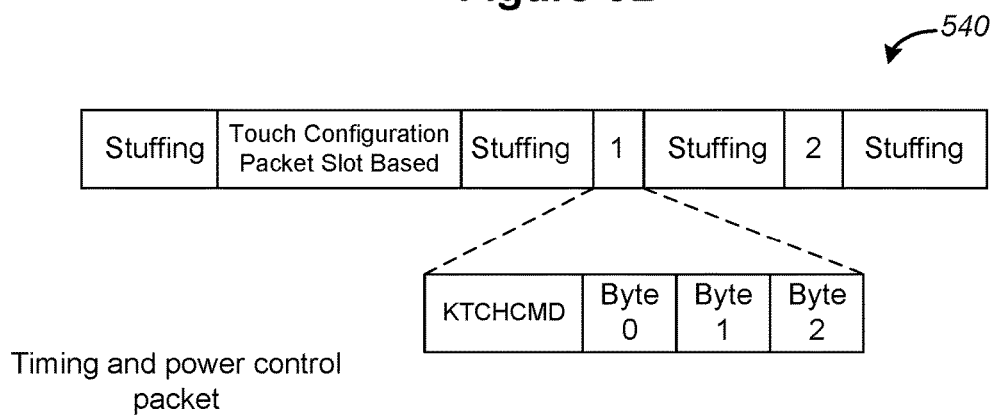

FIGS. 5B and 5C are example data structures of a touch sensing configuration packet 520 and a timing and power control packet 540 transmitted over a touch forward link 216B, in accordance with some embodiments. During the normal operation state, the touch forward channel transmitter 316 starts to send the touch control signal 120 including encoded touch forward channel packets to the touch forward channel receivers 328 in accordance with a determination that the receivers 328 are locked. The touch forward channel packets are consistent with the touch controller commands received by the touch sensing engine 460 and used to generate the touch control signal 120. The touch forward channel packet 520 corresponds to an instruction to initiate an active operation mode on a respective TSD 106 and touch sensors 224. In response to receiving the touch control signal 120 including the touch forward channel packet 520, the instruction to initiate the active mode is identified, and touch data 216 is generated and returned to the TTCON 204.

The touch forward channel receivers 328 decode and restore the touch forward channel packets 520 in the touch control signal 120 transmitted over the touch forward channels 216B, thereby controlling the touch AFE 332 to measure touch sensor data 126 from the touch sensors 224. The touch configuration packet 520 can either be frame based or slot based configuration registers, and both have the same structure. The touch configuration packet 520 has a start field 522, a header field 524 and a data field 526 including touch configuration data used to control the touch AFE 332 to measure touch sensor data from the touch sensors 224. The start field 522 includes data scrambling configuration, which is optionally selected between data scrambling enabled and data scrambling enabled with seed reset. In an example, the header field 524 has 5 bytes (Bytes 0, 1, 2, 3 and 4). Byte 0 selects one of the TSDs 106 and defines whether an operation is implemented to write data to, read data from, or burst read from the selected TSD 106. Bytes 1 and 2 are used to define a start page number and a start address. Bytes 3 and 4 are used to define a length of the relevant data (e.g., the touch sensor data measured from the touch sensors 224).

The touch configuration packet 520 can be used to read back the TSD's status, such as link error for quality monitoring, debug status. In some embodiments, when it is set to a read back mode, the touch configuration packet 520 only consists of 4 bytes Start and 5 bytes header. The read and burst read command are for status register readback. The only difference is that the status register is sent back after the touch data 126 if a read command is received, and the status register is sent back immediately for Burst Read command. Before a touch slot is configured, burst read is used to avoid waiting for the touch data 126 and causing a dead lock. It is optionally used during a touch timing debug stage.

Referring to FIG. 5C, the timing and power control packet 540 has a priority over the touch configuration packet 520, and is optionally inserted anywhere in the touch forward channel packet of the touch sense signal. In some embodiments, the TTCON 104 is configured to avoid a conflict between the time configuration packet 520 and the timing and power control packet 540 in the touch control signal 120 sent to the TSDs 106. In some embodiments, the timing and power control packet 540 includes a backward channel control data (e.g., "backward channel start" and "backward channel end") controlling a start and an end of the corresponding backward channel 218. In accordance with a determination that the backward channel control data of the timing and power control packet 540 indicates a request for starting/ending the corresponding backward channel 218, the corresponding backward channel 218 is started/terminated. In some embodiments, the timing and power control packet 540 includes a forward channel control data controlling an end of the corresponding touch forward channel 216B. In these embodiments, the timing and power control packet 540 optionally corresponds to an instruction to initiate an idle or sleep mode in which the touch forward channel 216B and/or the backward channel 218 of each TSD 106 is disabled.

Figure 6A:
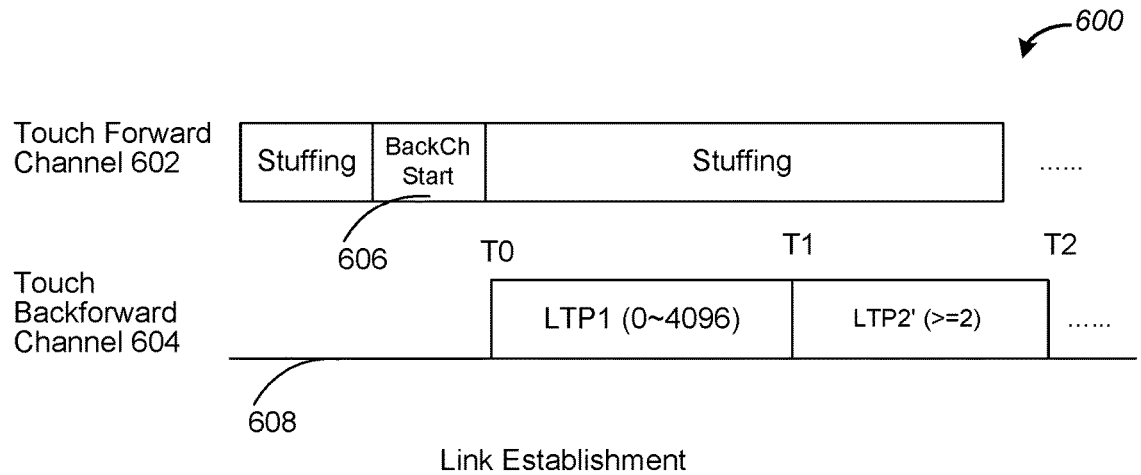
FIG. 6A illustrates data structures of a touch forward channel signal and a touch backward channel signal during a link establishment process, in accordance with some embodiments.

FIG. 6A illustrates data structures 600 of a touch forward channel signal 602 and a touch backward channel signal 604 during a link establishment process, in accordance with some embodiments. The TSDs 106 have a standby state, link training pattern transmission state and touch data/debug data transmission state. When power is on, the touch backward channel transmitter 336 must be in the Standby State and wait for "backward channel start" command 606 from the touch forward channel packet 520 of the touch control signal 120, e.g., the touch forward channel signal 602. During this state, an output of the touch backward channel transmitter 336 remains its default low ('L') 608. After the "backward channel start" command 606 is received, the touch backward channel transmitter 336 changes its state into the link training pattern transmission state. In the link training pattern transmission state, the touch backward channel transmitter 328 will send LTP1 (optional) and LTP2 pattern sequentially to train the touch backward channel receivers 318 for a period of time. After that, it keeps sending LTP2 pattern until touch data 126 is ready for transmission. When the touch date/status data 126 is ready for transmission, the touch backward channel transmitter 336 starts to send encoded touch packets to the touch backward channel receiver 318 until the data transmission is completed. The touch backward channel receiver 318 returns to initial state if it receives "backward channel end" command (e.g., BackCh End 626 in FIG. 6B) from the touch forward channel packet 520.

The touch backward channel is started by the TTCON 104 through command "backward channel start" 606 transmitted in the touch control signal 120. In some embodiments, the touch backward channel only can be started when both TCHBKP and TCHBKN are low, which indicates that the touch forward channel receivers 328 are in lock states (the touch backward channel transmitters 336 are also ready to start). In some embodiments, a duration between times T0 and T1 corresponds to a clock recovery stage. The signal LTP1 is programmable with 0-4096 symbols for the receivers 318 to achieve a bit and symbol lock state. A duration between times T1 and T2 corresponds to a symbol synchronization checking stage in which the signal LTP2 is repeated.

Figure 6B:
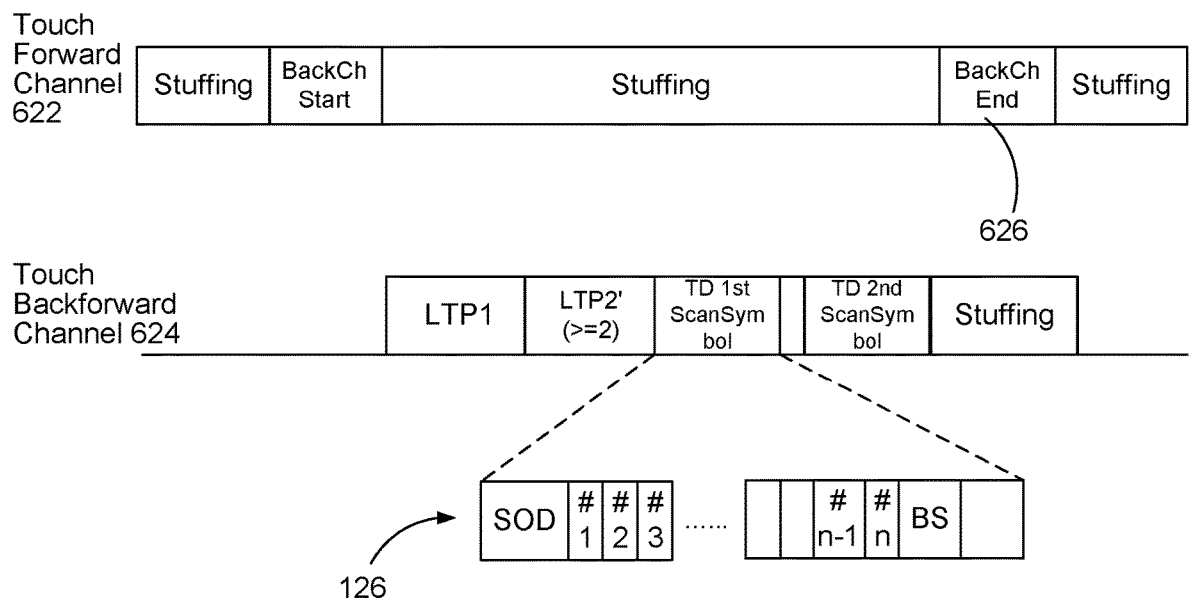
FIG. 6B illustrates data structures of a touch forward channel signal and a touch backward channel signal including touch data returned to a TTCON, in accordance with some embodiments.

FIG. 6B illustrates data structures 620 of a touch forward channel signal 622 and a touch backward channel signal 624 including touch data 126, in accordance with some embodiments. The touch data packet corresponding to the touch sense data 126 measured from touch sensors 224 starts with SOD, is followed by touch scan data and BS, and ends with stuffing data. An idle pattern can be inserted into the touch data 126 when it is needed. The SOD optionally selects one of four scrambling options: touch data scrambling disabled, touch data scrambling enabled, touch data scrambling enabled with seed reset, and burst read data scrambling enabled with seed reset. In some embodiments, to make touch data transfer design more flexible, or when touch data transfer is at in-continue mode, an idle pattern is inserted if data is empty.

Referring to 5A-5C and 6A-6B, after the touch forward link 216B is established, the touch forward channel transmitter 316 sends a touch control signal 120 from the TTCON 104 to the touch forward channel receiver 328 included in each TSD 106 over one or more forward links 216B. The touch control signal 120 specifies an operation mode and includes a touch forward channel packet 520 in an active operation mode. In the active operation mode, the disclosed bi-directional scalable intra-panel interface allows transmission of digital touch sense data 126 between a TTCON 104 and one or more TSD 106. In some embodiments, a touch receiver 318 is included in the one or more TSDs 106, and a digital signal processor is included in the TTCON 104. In such a configuration, a touch sensing engine 460 can be embedded in the TTCON 104 to simplify system design and to save cost. The touch control signal 120 may be separated from a display signal 122 and transferred from the TTCON 104 to the one or more TSDs 106 via a separate forward link 216B. Thus, no separate backward link control channel is needed. Moreover, for each TSD 106, both touch forward link 216B and backward link 218 include scramblers and encoders to reduce disturbances that affect the forward link 216B and the backward link 218. The touch sensor data 126 is transmitted to the TTCON 104 over the backward link 218 at a clock rate derived from the touch clock signal extracted from the touch control signal 120, therefore, no extra PLL is needed in the backward link path.

Figure 7:
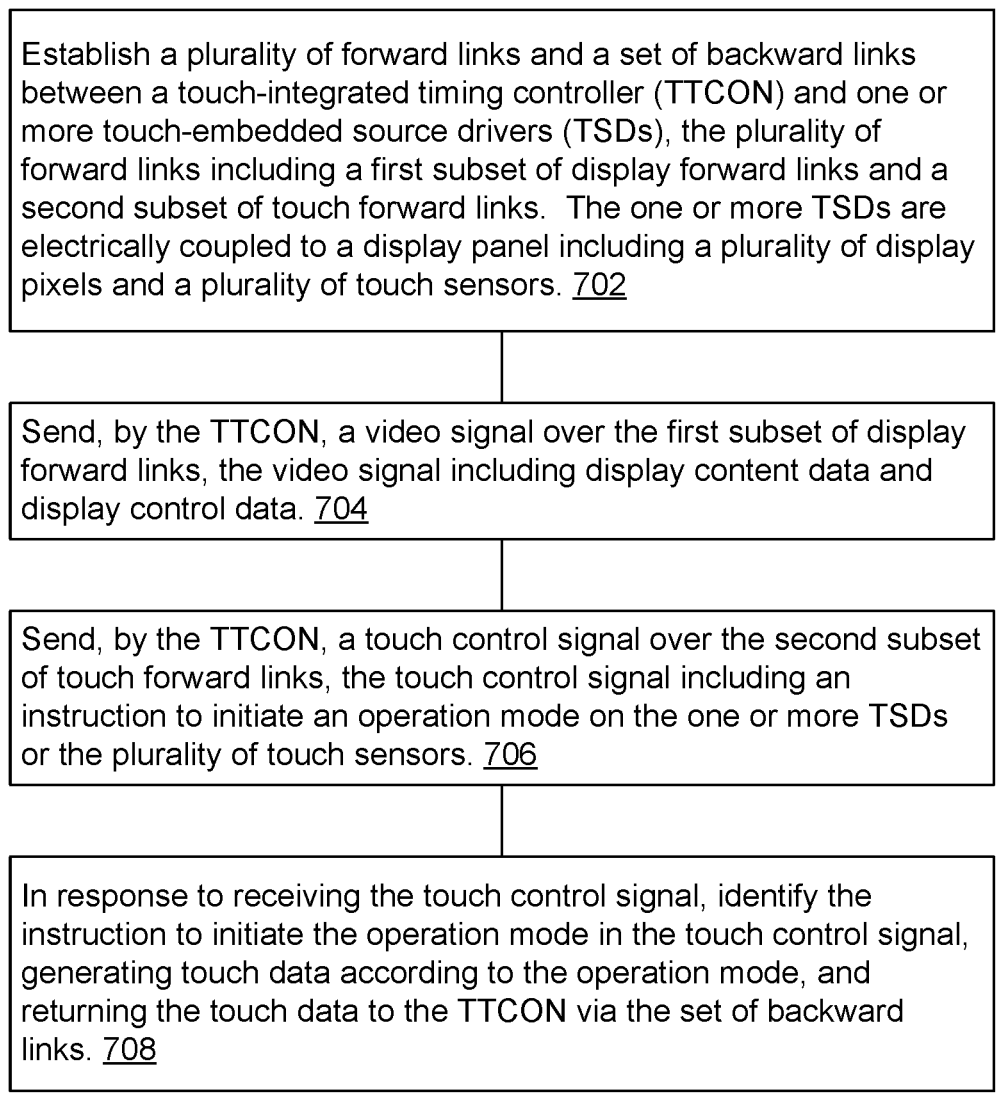
FIG. 7 illustrates a flowchart of a method for implementing intra-panel communication between a TTCON and one or more TSDs in a touch panel display subsystem, in accordance with some embodiments.

FIG. 7 provides a flowchart of a method 700 for implementing intra-panel communication between a TTCON 104 and one or more TSD 106 in a touch panel display subsystem, in accordance with some embodiments. The method 700 includes establishing (702) a plurality of forward links 216 and a set of backward links 218 between a touch-integrated timing controller (TTCON) 104 and one or more touch-embedded source drivers (TSDs) 106. The plurality of forward links 216 includes (702) a first subset of display forward links 216A and a second subset of touch forward links 216B. The one or more TSDs 106 are (702) electrically coupled to a display panel 125 including a plurality of display pixels 226 and a plurality of touch sensors 224. In some embodiments, during the course of establishing the forward and backward links, the TTCON 204 sends a low frequency reset signal (e.g., LTP0 in FIG. 5A) to the one or more TSDs 206 over the second subset of touch forward links 216B. In response to receiving the low frequency reset signal, touch control logic in the one or more TSDs 206B are reset and synchronized, thereby allowing the TSDs 206 to recover from an abnormal state. After the forward and backward links 216 and 218 are established, the TTCON 104 sends (704) a display drive signal over the first subset of display forward links 216A, and the display drive signal includes display content data and display control data. The TTCON 104 sends (706) a touch control signal 120 over the second subset of touch forward links 216B. The touch control signal 120 includes (706) an instruction to initiate an operation mode on the one or more TSDs 106 or the plurality of touch sensors 224. In response to receiving the touch control signal 120, the TSDs 106 identify (708) the instruction to initiate the operation mode in the touch control signal 120, generate touch data according to the operation mode, and return the touch data to the TTCON via the set of backward links 218.

In some embodiments, the first subset of display forward links 216A is physically separate from the second subset of touch forward links 216B. In some embodiments, the one or more TSDs 106 recover a touch clock signal from the touch control signal 120 provided by the second subset of touch forward links 216B. The touch clock signal has a touch clock frequency, and touch sensor data is sensed from the plurality of touch sensors 224 based on the touch clock signal. Further, in some embodiments, the one or more TSDs 106 recover a display clock signal from the display drive signal provided by the first subset of display forward links 216A. The display clock signal has a display clock frequency that is distinct from the touch clock frequency. The display panel is driven using the display content data based on the display clock signal. Additionally, in some embodiments, the touch data returned over the set of backward links 218 has a data rate that is equal to or divided from the touch clock frequency based on a panel size of the display panel.

In some embodiments, the operation mode is an active operation mode. To generate the touch data 126, the one or more TSDs 106 scan a subset of the plurality of touch sensors to obtain a plurality of touch sense signals, generate touch sensor data based on the plurality of touch sense signals, and serialize the touch sensor data to be returned to the TTCON via the set of backward links. Further, in some embodiments, the touch control signal 120 includes a set of multibit control data packets configured to define the instruction to initiate the active operation mode, and the set of multibit control data packets includes one or more of: a configuration data packet, a timing control packet, and a power control packet. More details on the multibit control data packets are discussed above with reference to FIGS. 5A-5C.

In some embodiments, during the course of establishing the forward and backward links, the one or more TSDs 106 receive a reset clock signal for resetting the second subset of touch forward links; receive a predefined train of link symbols (e.g., LTP1) via the second subset of touch forward links; in accordance with an identification of the predefined train of link symbols, setting a lock signal; receive a validity check signal (e.g., LTP2); and in response to receiving the validity check signal, determine a symbol boundary and whether the second subset of touch forward links 216 is established properly.

In some embodiments, the touch control signal 120 is sent over the second subset of touch forward links 216B to the one or more TSDs 106 during a vertical blanking period. In some embodiments, the touch control signal 120 is sent over the second subset of touch forward links to the one or more TSDs during an intra-frame pause.

In some embodiments, the operation mode is an idle operation mode. In response to receiving the touch control signal 120, the TTCON 104 and TSDs 106 maintain the set of backward links 218 in a disconnected state.

In some embodiments, a touch clock signal is extracted from the touch control signal 120. The touch data 126 is returned to the TTCON 104 over the set of backward links 218 at a data clock rate derived from the touch clock signal. Further, in some embodiments, the data clock rate is the same rate or sub-rate of the touch clock signal extracted from the touch control signal 120. Additionally, the one or more TSDs 106 include a scrambler (e.g., scrambler 413 in FIG. 4) coupled to the set of backward links, and the touch data 126 is scrambled using the scrambler of the one or more TSDs prior to being returned via the set of backward links 218.

In some embodiments, in accordance with a determination that returning the touch data 126 is completed, the set of backward links 218 is disabled, e.g., by disabling a touch backward channel transmitter 336 in the one or more TSDs 106 or a touch backward channel receiver 318 of the TTCON 104. The touch control signal 120 is updated to include an instruction to initiate an idle operation mode. The second subset of touch forward links 216B is disabled in accordance with the touch control signal 120, e.g., by disabling a touch forward channel receiver 328 in the one or more TSDs 106 or a touch forward channel transmitter 316 in the TTCON 104.

In some embodiments, the TTCON 104 receives a touch controller command indicating an expected amount of touch sensor data to be returned by the one or more TSDs, receives the touch data 126 from the one or more TSDs 106, compares an amount of the touch data 126 to the expected amount of touch sensor data, and disables the set of backward links 218 when the amount of the touch data 126 is equal to or greater than the expected amount of touch sensor data. Alternatively, in some embodiments, the information of the expected amount of touch sensor data is provided to the TSDs 106, and the TSDs 106 compare an amount of the touch data 126 with the expected amount of touch sensor data, and disable the set of backward links 218 (e.g., by disabling a touch backward channel transmitter 336 in the one or more TSDs 106).

In some embodiments, each touch forward link 216B is coupled to a touch forward channel transmitter 316 of the TTCON 104 and a respective touch forward channel receiver 328 of the one or more TSDs 106. Each backward link 218 is coupled to a respective touch backward channel transmitter 336 of the one or more TSDs 106 and a respective touch backward channel receiver 318 of the TTCON 104.

In some embodiments, each forward link 216 operates in accordance with a scalable intra-panel interface format.

In some embodiments, the TTCON 104 receives one or more touch controller commands from an external processor, and generates the touch control signal 120 based on the one or more touch controller commands.

In some embodiments, a touch sensing engine 460 is coupled to the TTCON 104, and configured to enable the second subset of touch forward links 216B and the set of backward links 218 when the one or more touch controller commands indicate the operation mode specified by the touch control signal 120 is a link establishment mode or an active operation mode. Alternatively, in some embodiments, a touch sensing engine is coupled to the TTCON, and configured to disable the second subset of touch forward links 216B and the set of backward links 218 when the one or more touch controller commands indicates the operation mode specified by the touch control signal 120 is an idle operation mode.

In some embodiments, the one or more TSDs 106 include a first TSD (e.g., 106-1 in FIG. 3) and a second TSD (e.g., 106-*n* in FIG. 3). A first set of display content data is sent to the first TSD via a first display forward link. A second set of display content data is sent to the second TSD via a second display forward link. The same touch control signal 120 is sent to the first TSD and the second TSD via a same touch forward link. That said, a 1 to N multi-drop link between the TTCON 104 and TSDs 106 is formed.

In one aspect, this application is directed to an electronic device including one or more TSDs 106, a TTCON 104, a plurality of forward links 216, and a set of backward links 218. The electronic device is configured to implement the method 700 as described with reference to FIG. 7. In another aspect, this application is directed to a non-transitory computer-readable medium, having instructions stored thereon, which when executed by one or more processors cause the processors to perform the method 700.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion embodied as executable instructions or code) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least some embodiments. The phrase "in some embodiments" in various places in the specification is not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a bi-directional scalable intra-panel interface disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described.

What is claimed is:

1. A method for intra-panel communication, the method comprising:
    establishing a plurality of forward links and a set of backward links between a touch-integrated timing controller (TTCON) and one or more touch-embedded source drivers (TSDs), the plurality of forward links including a first subset of display forward links and a second subset of touch forward links, wherein the one or more TSDs are electrically coupled to a display panel including a plurality of display pixels and a plurality of touch sensors;
    sending, by the TTCON, a display drive signal over the first subset of display forward links, the display drive signal including display content data and display control data;
    sending, by the TTCON, a touch control signal over the second subset of touch forward links, the touch control signal including an instruction to initiate an operation mode on the one or more TSDs or the plurality of touch sensors; and
    in response to receiving the touch control signal, identifying the instruction to initiate the operation mode in the touch control signal, generating touch data according to the operation mode, and returning the touch data to the TTCON via the set of backward links.

2. The method of claim 1, further comprising, in the one or more TSDs:
    recovering a touch clock signal from the touch control signal provided by the second subset of touch forward links, the touch clock signal having a touch clock frequency; and
    sensing touch sensor data from the plurality of touch sensors based on the touch clock signal.

3. The method of claim 2, further comprising, in the one or more TSDs:
    recovering a display clock signal from the display drive signal provided by the first subset of display forward links, the display clock signal having a display clock frequency that is distinct from the touch clock frequency;
    driving the display panel using the display content data based on the display clock signal.

4. The method of claim 2, wherein the touch data returned over the set of backward links has a data rate that is equal to or divided from the touch clock frequency based on a panel size of the display panel.

5. The method of claim 1, wherein the operation mode is an active operation mode, and generating the touch data according to the operation mode further comprises, at the one or more TSDs:
    scanning a subset of the plurality of touch sensors to obtain a plurality of touch sense signals;
    generating touch sensor data based on the plurality of touch sense signals; and
    serializing the touch sensor data to be returned to the TTCON via the set of backward links.

6. The method of claim 5, wherein the touch control signal includes a set of multibit control data packets configured to define the instruction to initiate the active operation mode, and the set of multibit control data packets includes one or more of: a configuration data packet, a timing control packet, and a power control packet.

7. The method of claim 1, wherein the first subset of display forward links is physically separate from the second subset of touch forward links.

8. The method of claim 1, wherein establishing the plurality of forward links and the set of backward links further comprises, at the one or more TSDs:
    receiving a reset clock signal for resetting the second subset of touch forward links;
    receiving a predefined train of link symbols via the second subset of touch forward links;
    in accordance with an identification of the predefined train of link symbols, setting a lock signal;
    receiving a validity check signal; and
    in response to receiving the validity check signal, determining a symbol boundary and whether the second subset of touch forward links is established properly.

9. The method of claim 1, wherein the touch control signal is sent over the second subset of touch forward links to the one or more TSDs during one of a vertical blanking period and an intra-frame pause.

10. The method of claim 1, wherein the operation mode is an idle operation mode, further comprising:
    in response to receiving the touch control signal, maintaining the set of backward links in a disconnected state.

11. An electronic device, comprising:
    one or more TSDs configured to couple to a display panel including a plurality of display pixels and a plurality of touch sensors;
    a TTCON configured to provide a display drive signal and a touch control signal, the display drive signal including display content data and display control data, the touch control signal including an instruction to initiate an operation mode on the one or more TSDs or the plurality of touch sensors;
    a plurality of forward links and a set of backward links, the forward link including a first subset of display forward links and a second subset of touch forward links, wherein the forward and backward links are coupled between the TTCON and the one or more TSDs;

wherein the TTCON is configured to send the display drive signal to the one or more TSDs over the first subset of display forward links and send the touch control signal to the one or more TSDs over the second subset of touch forward links; and wherein the one or more TSDs are configured to in response to receiving the touch control signal, identify the instruction to initiate the operation mode in the touch control signal, generate touch data according to the operation mode, and return the touch data to the TTCON via the set of backward links.

12. The electronic device of claim 11, wherein the one or more TSDs are further configured to extract a touch clock signal from the touch control signal, wherein the touch data is returned to the TTCON over the set of backward links at a data clock rate derived from the touch clock signal.

13. The electronic device of claim 12, wherein the data clock rate is the same rate or sub-rate of the touch clock signal extracted from the touch control signal.

14. The electronic device of claim 11, wherein a touch sensing engine is coupled to the TTCON, and configured to enable the second subset of touch forward links and the set of backward links when the one or more touch controller commands indicates the operation mode specified by the touch control signal is a link establishment mode or an active operation mode.

15. The electronic device of claim 11, wherein a touch sensing engine is coupled to the TTCON, and configured to disable the second subset of touch forward links and the set of backward links when the one or more touch controller commands indicates the operation mode specified by the touch control signal is an idle operation mode.

16. A non-transitory computer-readable medium, having one or more programs stored thereon, the one or more programs including instructions which when executed by one or more processors cause the processors of an electronic device to perform:
 establishing a plurality of forward links and a set of backward links between a touch-integrated timing controller (TTCON) and one or more touch-embedded source drivers (TSDs), the plurality of forward links including a first subset of display forward links and a second subset of touch forward links, wherein the one or more TSDs are electrically coupled to a display panel including a plurality of display pixels and a plurality of touch sensors;
 sending, by the TTCON, a display drive signal over the first subset of display forward links, the display drive signal including display content data and display content data;
 sending, by the TTCON, a touch control signal over the second subset of touch forward links, the touch control signal including an instruction to initiate an operation mode on the one or more TSDs or the plurality of touch sensors; and
 in response to receiving the touch control signal, identifying the instruction to initiate the operation mode in the touch control signal, generating touch data according to the operation mode, and returning the touch data to the TTCON via the set of backward links.

17. The non-transitory computer-readable medium of claim 16, the one or more programs further comprising instructions for:
 disabling the set of backward links;
 updating the touch control signal to include an instruction to initiate an idle operation mode; and
 disabling the second subset of touch forward links in accordance with the touch control signal.

18. The non-transitory computer-readable medium of claim 16, the one or more programs further comprising instructions for:
 receiving information of an expected amount of touch sensor data to be returned by the one or more TSDs;
 receiving the touch data from the one or more TSDs;
 comparing an amount of the touch data to the expected amount of touch sensor data; and
 disabling communication via the set of backward links when the amount of the touch data is equal to or greater than the expected amount of touch sensor data.

19. The non-transitory computer-readable medium of claim 16, wherein the one or more TSDs include a first TSD and a second TSD, and the one or more programs further comprise instructions for:
 sending a first set of display content data to the first TSD via a first display forward link;
 sending a second set of display content data to the second TSD via a second display forward link; and
 sending the touch control signal to the first TSD and the second TSD via a same touch forward link.

20. The non-transitory computer-readable medium of claim 16, wherein establishing the plurality of forward links and the set of backward links between the TTCON and the TSDs further comprises:
 sending a low frequency reset signal from the TTCON to the one or more TSDs over the second subset of touch forward links; and
 in response to receiving the low frequency reset signal, resetting and synchronizing the one or more TSDs.

\* \* \* \* \*